INVENTORS
Otto Krauss
Manfred Link
Leonhard Kraus
BY Michael S. Striker
ATT

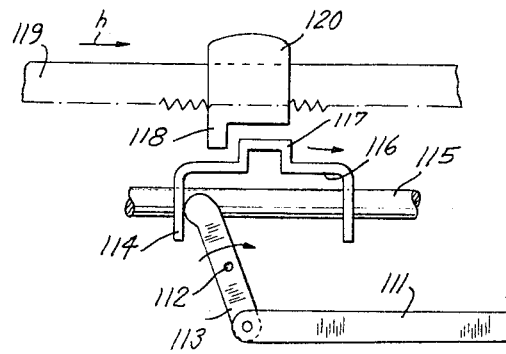
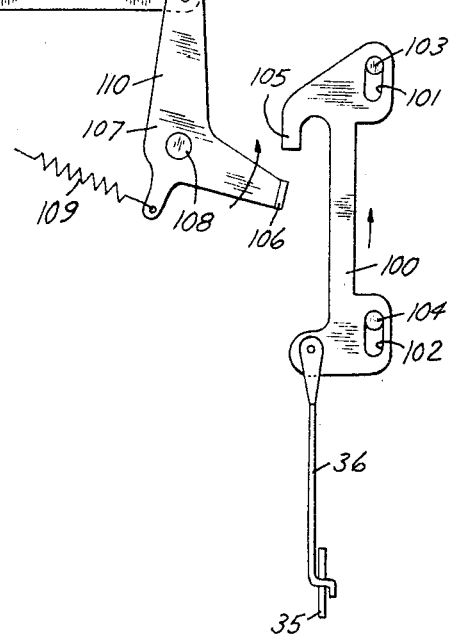
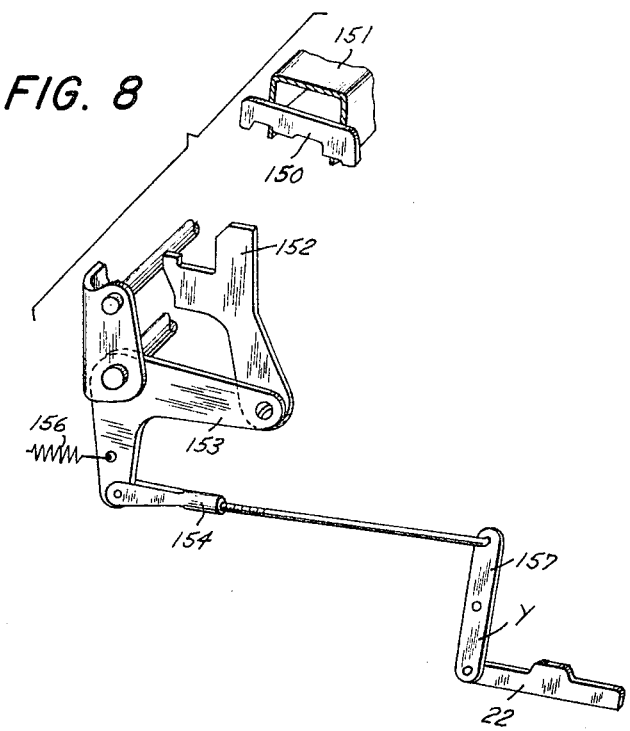
FIG. 9
FIG. 8
INVENTORS
Otto Krauss
Manfred Link
Leonhard Kraus
Michael S. Striker
BY United States Patent Office 3,268,051
Patented August 23, 1966

3,268,051
MEANS PREVENTING SIMULTANEOUS OPERATION OF CARRIAGE RETURN AND ANY OTHER CARRIAGE CONTROL FUNCTION
Otto Krauss and Manfred Link, Nurnberg, and Leonhard Kraus, Coburg, Germany, assignors to Max Grundig, Furth, Bavaria, Germany
Continuation of application Ser. No. 233,528, Oct. 29, 1962. This application Dec. 27, 1965, Ser. No. 517,525
Claims priority, application Germany, Oct. 27, 1961, G 33,444
17 Claims. (Cl. 197—65)

This is a continuation application of our copending application Serial No. 233,528, filed October 29, 1962.

The present invention relates to a paper carriage return control arrangement, and more particularly to apparatus for preventing any disturbance of the return movement of the paper carriage of a business machine by the untimely actuation of carriage control means, which are intended to be operated only when the carriage is at a standstill, and under no circumstances while the carriage performs the return movement.

For example, when the carriage return key of an electric typewriter is actuated, the carriage is returned to a starting position while the escapement pawl is released. If during such return movement, the operator actuates, for example, the back spacing key, the back spacing pawl will engage the rack bar of the paper carriage and interfere with the return movement. Carriage return movement is impeded in a similar manner when the space bar or the tabulator key is operated during the return movement of the carriage.

Electric typewriters or other business machines can be in an operative condition while they are disconnected from the source of voltage. For example, the plug may be taken out from the wall socket, or a fuse may blow and disconnect the machine. When the machine is switched on in this condition, the keys can be manually operated, since the key locking means is not energized. If in this inoperative condition of the machine, the carriage return key, and then the space bar or the back spacing key is actuated, the carriage will be jammed when the current is again supplied to the machine, and a repair of the machine by a skilled mechanic becomes necessary.

It is one object of the present invention to provide a fool proof business machine in which no action by the operator can cause jamming of the paper carriage during the carriage return movement.

Another object of the present invention is to provide a carriage return control arrangement by which the carriage is no longer driven to perform a return movement when operator controlled means are placed in a position engaging the carriage.

Another object of the present invention is to disconnect the carriage return drive means from the carriage when the same is engaged by an element mounted on the stationary frame of the machine, or when such element is moved toward a position engaging the carriage.

Another object of the present invention is to provide a business machine in which the actuation of the back spacing means, of the space bar, or of the tabulator during a carriage return movement cannot cause blocking or jamming of the carriage.

Another object of the invention is to provide means for disengaging a coupling between drive means and the paper carriage when the back spacing means, the space bar, or the tabulator means are in an operative position.

With these objects in view, the present invention relates to a carriage return control arrangement which is particularly applied to business machines, such as electric typewriters or accounting machines having a paper carriage which moves in one direction during typing operations, and in an opposite return direction under control of a carriage return key. One embodiment of the invention comprises carriage return means having an inoperative condition, and an operative condition for moving the carriage of the machine in a return direction from one end position to the other end position thereof; and at least one carriage control means, such as a back spacing means or a spacing means, movable between an inoperative position, and an operative position engaging the carriage.

In accordance with the present invention, the carriage control means is connected with the carriage return means in such a manner that the same are rendered inoperative when the carriage control means is moved to its operative position in which it would impede the carriage return movement. Consequently, the carriage is not driven by the carriage return means when engaged by the carriage control means, for example, by the pawl of the back spacing means.

In the preferred embodiment of the invention power operated carriage drive means are connected by coupling means with the carriage means, and the coupling is disengaged when the carriage control means is actuated by the operator to move to the operative position in which it is adapted to engage the carriage and to impede its movement. When the carriage return movement is desired by the operator, the coupling is moved to its coupling position so that the carriage is driven to return to its starting position.

In one embodiment of the invention coupling means are provided which tend to move to a disengaged position, and locking means are provided for locking the coupling in the coupling position. The operator controlled carriage control means is connected with the locking means to release the same, when actuated, so that the coupling means automatically returns under the action of a spring to the disengaged position in which the carriage is no longer driven by the continuously operating power operated carriage drive means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 7:
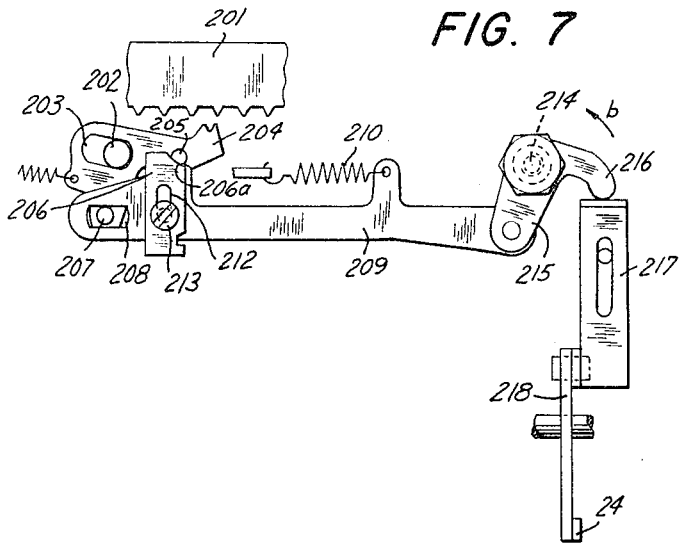
Figure 4:
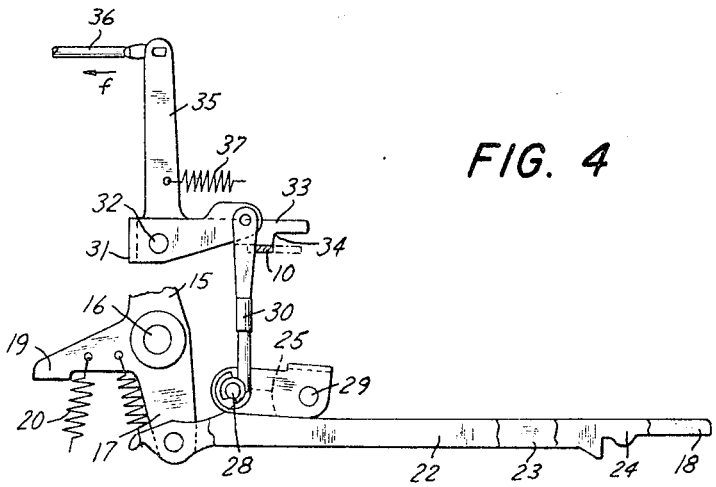
Figure 5:
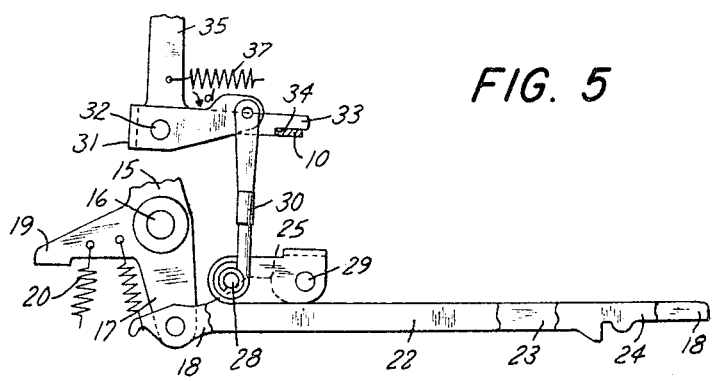
Figure 6:
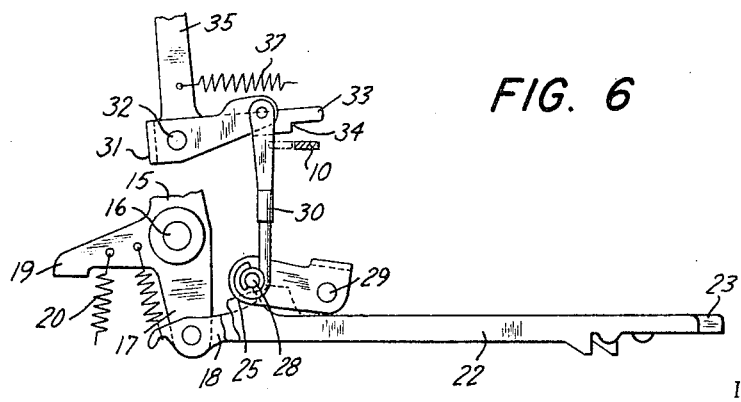

FIGS. 4, 5, and 6 are fragmentary side elevations illustrating successive operational positions of the mechanism;

FIG. 7 is a fragmentary plan view illustrating a back spacing device whose operation influences the operation of the carriage return control arrangement illustrated in FIGS. 1 to 6;

FIG. 8 is a fragmentary perspective view illustrating a tabulator device influencing the operation of the carriage return control arrangement illustrated in FIGS. 1 to 6; and FIG. 9 is a fragmentary plan view illustrating a margin stop arrangement influencing the operation of the carriage return control arrangement illustrated in FIGS. 1 to 6.

Figure 1:
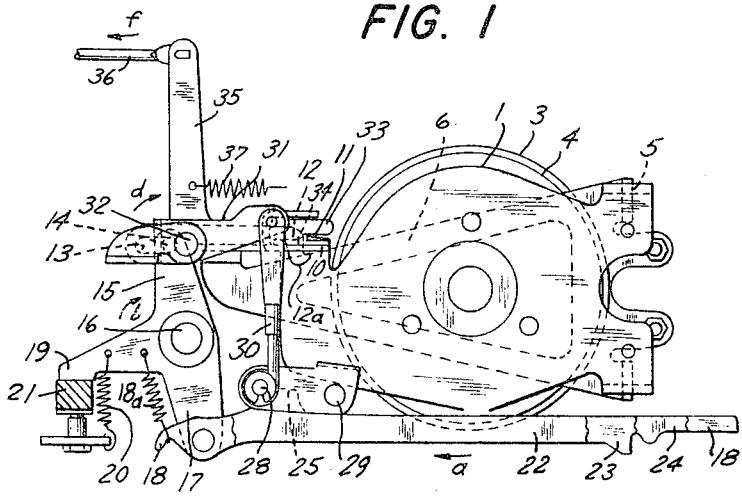
FIG. 1 is a fragmentary side elevation of a preferred embodiment of the invention.
Figure 2:
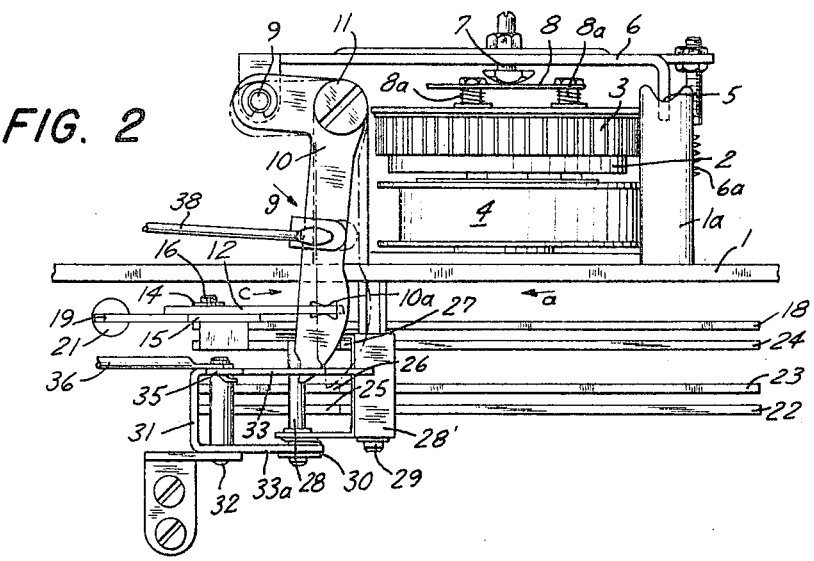
FIG. 2 is a fragmentary plan view of the embodiment of FIG. 1.
Figure 3:
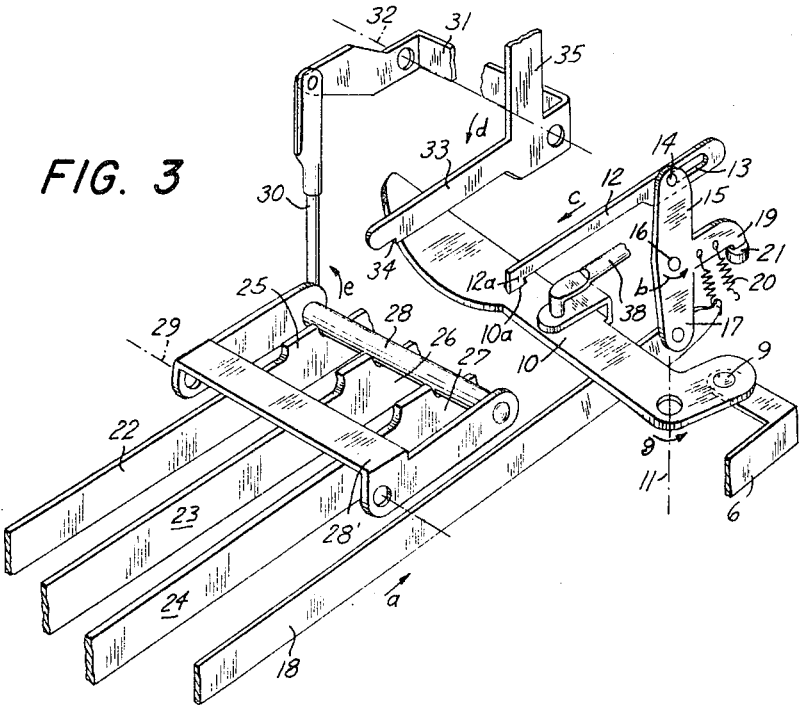
FIG. 3 is a fragmentary perspective view illustrating on an enlarged scale a mechanism forming part of the embodiment of FIGS. 1 and 2.

Referring now to the drawings, and more particularly to FIGS. 1, 2 and 3, on a side wall 1 of the machine frame, a coupling 2 is mounted which includes a wheel 3 driven by a belt, not shown, from an electric motor, not shown, to continuously rotate as long as the machine is switched on. The coupling has a coupling position in which wheel 3 is coupled with a pulley 4 on which a band or cord, not shown, is wound up during rotation of pulley 4. The end of the band or cord is connected in a conventional manner to the paper carriage, not shown, of the machine, which may be an electric typewriter or any other business machine; so that the carriage is moved in a return movement from the left to the right when coupling 2 is in its coupling position.

A notch in a stationary bracket 1a is engaged by the edge 5 of a rockable member 6 carrying an adjustable screw 7 whose head abuts a plate 8 connected by resilient elements 8a to the shiftable wheel 3 of the coupling means 2. The free end of member 6 is connected by pivot 9 to an angular lever 10 mounted for turning movement on a pivot 11 which is secured to the stationary frame of the machine. When lever 10 is turned in counterclockwise direction as indicated by the arrow g, coupling 2 is shifted to its coupling position, and a carriage return movement is started. However, a spring 6a secured to member 6 urges the same and lever 10 to the position illustrated in solid lines in FIG. 2 in which coupling 2 is disengaged.

A shiftable slide member 12 has a hook-shaped end portion 12a passing into a cutout 10a of lever 10. The other end of the shiftable slide member 12 has an elongated slot 13 into which a pin 14 of a three-armed lever 15 passes which is turnably mounted on a stationary stud 16. The connection 13, 14 constitutes a lost-motion device between members 15 and 12. An operator controlled bar 18 is turnably connected with the end of arm 17 of lever 15. Bar 18 is connected through another lever, not shown, to the carriage return key, and is shifted in a conventional manner in the direction of the arrow a when the carriage return key is actuated by the operator who desires to start a carriage return movement.

A spring 18a connects the end of the operator influenced bar 18 with arm 19 of lever 15. Another spring 20 is also connected to arm 19 and to a stationary frame part to urge lever 15 to turn in counterclockwise direction to the position illustrated in FIG. 1 in which the end of arm 19 abuts an adjustable stop 21 on the frame of the machine. By the position of lever 15, the normal position of bar 18 is determined, but when the bar 18 is shifted to the left in the direction of the arrow a, lever 15 will turn in the direction of the arrow b while arm 19 moves away from stop 21. Since pin 14 abuts one end of slot 13, slide 12 is shifted in a direction of the arrow c when the carriage return key effects movement of the carriage return bar 18 in the direction of the arrow a. Angular lever 10 is turned in the direction of the arrow a to the position illustrated in broken lines in FIGS. 2 and 4. Rockable member 6 is angularly displaced, and shifts through members 7, 8 and 8a coupling means 2 to the coupled position so that the carriage return movement is started.

When lever 10 is turned in the direction of the arrow g, a link 38 is shifted which is connected to the escapement mechanism so that the carriage is released by the escapement pawl when the return movement is started by coupling 2 in coupling position.

Several operator controlled bars extend parallel to the carriage return bar 18. Bar 24 is shifted when the back spacing key, not shown, is actuated by the operator, bar 23 is shifted when the space bar, not shown, is actuated, and bar 22 is shifted when the tabulator key, not shown, is actuated. Each of bars 22, 23, 24 is shiftable in the direction of the arrow a to operate a means which engages the carriage.

Referring now to FIG. 7, bar 24 is pivotally connected to a lever 218 whose other end is articulated to a member 217 so that the same is shifted when bar 24 is shifted by the back spacing key. Member 217 turns a lever 215 about the pivot 214 so that a link 209 is shifted and displaces a cam 206 secured thereto by a screw 213. Link 209 is guided by a stationary pin 207 slidable in a slot 208 of link 209. When cam 206 is shifted, the inclined cam face 206a urges a pin 205 to move upward as viewed in FIG. 7 so that a back spacing pawl 204 is turned about a stud 202 which is slidable in a slot 203 in pawl 204. When pawl 204 turns in counterclockwise direction about a stud 202 it assumes a position engaging the teeth of rack bar 201 which is secured to the carriage and moves with the same. Further movement of link 209 to the right will cause shifting of pawl 204 to the right, with stud 202 sliding in slot 203 so that the carriage is shifted to the right with rack bar 201 causing a one step return movement of the carriage.

If the back spacing carriage control means shown in FIG. 7 are shifted to the position in which pawl 204 engages rack bar 201, a return movement of the carriage released by operation of the carriage return bar 18, would cause jamming of the machine.

FIG. 8 shows in a simplified manner tabulating means controlled by the tabulator control bar 22 when the tabulator key is actuated. Tabulator control bar 22 is articulated to a double-armed lever 157 which is connected by a link 154 to an angular lever 153. A spring 156 urges lever 153 to turn in a clockwise direction as viewed in FIG. 8 and to pull down a tabulator stop member 152. When tabulator control means 22 is actuated by the operator, member 152 is raised to a position located in the path of movement of a tabulator stop 150 which is set in a slot of a member 151 secured to the carriage of the machine. A series of tabulator stops 150 is provided, and each tabulator stop can be set to an operative position in which a portion thereof moves together with the carriage along a path in which tabulator member 152 is located in its raised blocking position. It is evident that tabulator member 152 in its blocking position will interfere with the carriage return movement if the operator actuates tabulator control bar 22 during the return movement of the carriage.

It will be understood that actuation of the spacing control bar 23 will cause engagement between an escapement pawl and a rack bar on the carriage, which is undesired during the carriage return movement.

The operator controlled bars 22, 23, 24 have cam projections 25, 26 and 27, respectively, which cooperate with a linkage rod 28 extending between the legs of a U-shaped linkage bridge member 28' mounted for turning movement on a shaft 29. A connecting rod 30 extends between bridge member 28', and a U-shaped member 31 which is also turnable about a shaft 32 mounted in the frame. One leg 33 of the U-shaped member 31 has at its free end a shoulder 34 cooperating with the angular lever 10. An arm 35 transversely projects from leg 33, and is connected to a linking wire 36 to a margin stop device as shown in FIG. 9.

Linking wire 36 is connected to a slide 100 which is guided on a pair of pins 102 and 103 projecting into a pair of slots 101 and 102. An angular lever 107 is turnable about a shaft 108 and is biased by spring 109. A transverse projection 106 cooperates with the abutment 105 of slide 100, while the arm 110 is connected by a link 111 to a double-armed lever 113 turnable about a stud 112. One end portion of lever 113 engages the arm 114 of a U-shaped member 116 mounted on a guide rod 115 for sliding movement. A projection 117 of member 114 moves in the region of a projection 118 of an adjustable margin stop 120 mounted on the margin bar 119. Members 119 and 120 form part of the paper carriage of the machine and move with the same.

*Operation*

When the operator influenced bar 18 is shifted in the direction of the arrow a by operation of the carriage return key, not shown, lever 15 turns in the direction of the arrow *b* and shifts slide member 12 in the direction of the arrow *c* so that angular lever 10 turns about its axis 11 from the position shown in solid lines in FIGS. 2, 3 and 4 to the position shown in broken lines in FIGS. 2 and 4 and in solid lines in FIG. 5. In the position best seen in FIG. 4, spring 37 urges member 31 to turn in the direction of the arrow *d*, but since arm 33 abuts lever 10, such turning is not possible until lever 10 is displaced to the position of FIG. 5. As soon as lever 10 has passed shoulder 34 of arm 33, member 31 turns a small angle to the position of FIG. 5 so that angular lever 10 is locked in this position. Bridge member 28' is turned a corresponding angle about shaft 29 so that the cross rod 28 is lowered and located directly opposite the cam projections 25, 26, 27 of the control bars 22, 23, 24.

The connecting wire 38 is shifted by the angular lever 10, and withdraws the escapment pawl, not shown, from the rack bar of the carriage so that the carriage is free to move. Turning of angular lever 10 to the position shown in broken lines in FIG. 2 causes turning of member 6, and shifting of the power driven wheel 3 of coupling 2 in axial direction so that pulley 4 is coupled to the power drive and is turned to move the carriage in the return direction by winding up a belt or cord, not shown, secured to the carriage in a conventional manner. The carriage moves now in the return direction.

When the carriage return key, not shown, is released by the operator in the conventional manner, spring 20 turns lever 15 in counterclockwise direction opposite to the direction of the arrow *b* so that bar 18 is returned to the right to its initial position. Since pin 14 of lever 15 moves in slot 13 of slide 12, lever 15 can turn opposite to the direction of the arrow *b* without actuating or shifting slide 12. Consequently, slide 12 does not exert any shifting force on angular lever 10 which is still locked by engagement with shoulder 34. Therefore, the coupling 2 remains in coupled position and the carriage continues its return movement when the operator influenced bar 18 is released.

Referring again to FIG. 9, the toothed margin bar 119 and the left margin stop 120 move in the direction of the arrow *b* during the return movement of the carriage. In the end position of the carriage, projection 118 engages projection 117 and shifts member 116 to the right as viewed in FIG. 9 so that the linkage 113, 111, 107 is operated to shift slide 100 so that connecting wire 36 is shifted in the direction of the arrow *f* and turns member 31 in a direction opposite to the arrow *d* from the position shown in FIG. 5 to the position shown in FIG. 6 so that the locking means 33, 34 release the operating lever 10 of the coupling means 2, 3, 4, 5, 6, 7, 8, 8a, and 10. Springs 8a move the coupling 2 to the disengaged position in which the drive wheel 3 no longer drives pulley 4 so that the carriage is no longer power driven, and stops.

The carriage return movement requires a certain time, and it is possible that an operator may actuate a carriage control device, such as the back spacing device, the space bar, or the tabulator means during the return movement of the carriage which would cause engagement between the respective device and the carriage against the driving force of the carriage drive means, i.e. the motor driven wheel 3. In this manner jamming of the carriage would occur, and parts may be damaged so that repairs would have to be carried out by a skilled mechanic.

However, when anyone of the operator controlled carriage control means 22, 23, 24 is operated during the return movement of the carriage, the respective cam projection 25, 26, or 27 engages the cross rod 28 which is located directly in front of cam projections 25, 26, 27 in the position of FIG. 5 assumed by the parts during the return movement of the carriage. The respective cam projection acts on the linkage rod 28 to turn linkage member 28' about shaft 29 in the direction of the arrow *e* to the position shown in FIG. 6 in which locking means 31, 33, 34 is raised so that shoulder 34 is separated from lever 10 which controls coupling 2, permitting coupling 2 to move to its disengaged position under the action of springs 8a. Consequently, the connection between the power drive and the carriage is interrupted, and the carriage comes to a stop by the action of the carriage control means engaging the carriage. For example, the back spacing stop 204 may engage the rack bar 201 of the carriage, as shown in FIG. 7, or the tabulator stop 152 may engage a tabulator stop 150, as shown in FIG. 8. When lever 10 returns to its normal position upon disengagement of coupling 2, the escapement mechanism is controlled by the linking wire 38 to advance the escapement pawl to its normal position so that the carriage is stopped which may take place before tabulator member 152 engages a tabulator stop 150.

When the actuated operator controlled means 22, 23, or 24 is released by the operator, it returns to its normal position under the action of a spring acting in a conventional manner on the respective operator controlled key. Cross rod 28 slides off the top of the respective cam projection 25, 26, or 27 on which it was resting, and members 28' and 31 turn under the action of spring 37 to the initial position shown in FIG. 4 in which the coupling 2 is disengaged, and the locking means 31, 33, 34 are released since arm 33 rests on lever 10 as best seen in FIGS. 3 and 4. In addition to the advantage obtained by preventing any accidental jamming of the carriage by improper operation, the arrangement of the present invention can be used for purposely controlling and interrupting the return movement of the carriage. For example, if the carriage had arrived at the end of a line, and the operator intends to indent the next following line to form a paragraph, the operator first actuates the carriage return means, and then operates for example, the space bar in the position of the carriage in which he intends to stop the carriage return movement, so that the carriage stops in a position corresponding to a new paragraph.

It will be understood that each of the elements described above, or two or more together, may also find a useful application in other types of carriage return control arrangements differing from the types described above.

While the invention has been illustrated and described as embodied in a mechanism for interrupting the power drive of the paper carriage of a business machine when the paper carriage is engaged by a control means actuated by the operator, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A carriage return control arrangement, comprising, in combination, carriage return means having an inoperative condition and an operative condition for moving a carriage means in a return direction; means permanently urging said carriage return means to move from said operative to said inoperative condition thereof; manually controlled means for placing said carriage return means from said inoperative into said operative condition thereof; locking means having a locking condition for locking said carriage return means in said operative condition, and a releasing condition in which said carriage return means assumes under the action of said urging means said inoperative condition thereof; a plurality of independently operable carriage control means each movable between an inoperative position and an operative position for engaging the carriage means so that return movement of said carriage is impeded; and means operatively connecting each of said carriage control means with said locking means to place the same in said releasing condition when the respective carriage control means is moved to said operative position thereof engaging said carriage means whereby said carriage return means is moved by said urging means into said inoperative condition thereof, so that said carriage means is not driven by said carriage return means while engaged by said carriage control means.

2. A carriage return control arrangement according to claim 1 wherein said carriage return means include continuously rotating carriage drive means, and coupling means movable between an inoperative position and a coupling position for connecting said carriage drive means with the carriage means; wherein said manually controlled means are operatively connected with said coupling means for causing movement of the same to said coupling position; wherein said carriage control means include a back spacing pawl and an escapement pawl; and wherein the means which connect the carriage control means with the locking means include a linkage means operatively connecting each carriage control means with said coupling means to move said coupling means to said inoperative position when a carriage control means is moved to its operative position.

3. A carriage return control arrangement according to claim 2 wherein said locking means lock said coupling means in said coupling position; wherein said plurality of carriage control means include control members adapted to be selectively actuated by an operator to move parallel to each other, and a plurality of engaging members respectively operated by said control members between an inoperative position and an operative position for engaging the carriage means so that carriage return movement is impeded; and wherein said means which connect each carriage control means with said locking means include a linkage member extending across said control members, and means connecting said linkage member with said locking means for operatively connecting each actuated carriage control means with said locking means to release said locking means so that said coupling means moves to said inoperative position.

4. A carriage return control arrangement according to claim 3 wherein said locking means has a released position and a locking position; and wherein said linkage member is movable to and from a position cooperating with said carriage control means and connected with said locking means so as to assume said operating position when said locking means is in said locking position and said coupling means is in said coupling position.

5. A carriage return control arrangement according to claim 1 wherein said carriage return means include drive means, and coupling means having a disengaged position and a coupling position for connecting said drive means with the carriage means; wherein said permanently urging means include biasing means urging said coupling means to said disengaged position; wherein said manually controlled means are connected with said coupling means for shifting the same to said coupling position to cause a carriage return movement; wherein said locking means automatically lock said coupling means in said coupling position; wherein said plurality of carriage control means include a back spacing device and a tabulator device; and wherein upon release of said locking means by any one carriage control means said coupling means move to said disengaged position whereby said drive means is separated from said carriage means when the respective carriage control means impedes the return movement of the carriage means.

6. A carriage return control arrangement according to claim 5 including shiftable lever means operatively connected with said coupling means for moving the same between said position; wherein said manually controlled means are operatively connected with said lever means for shifting the same; and wherein said carriage control means respectively include engaging means for engaging the carriage means, and a control bar shiftable to and from an actuated position for moving the respective engaging means to a position engaging the carriage; and including a rod extending transversely to said control bars so as to be engaged and displaced by the same during movement to said actuated position for effecting release of said locking means whereby said coupling means move to said disengaged position.

7. A carriage return control arrangement according to claim 1 wherein each of said carriage control means includes an engaging member movable between an inoperative position and an operative position engaging the carriage means so that return movement is impeded, and a control member movable for operating said engaging member and having a cam portion; and including a linkage member cooperating with all said cam portions and being displaced when any one of said control members is operated to place the correlated engaging members in said operative position thereof, said linkage members being operatively connected with said locking means to place the same in said releasing condition when said linkage member is displaced.

8. A carriage return control arrangement according to claim 7 wherein said carriage control means include a back spacing device, an escapement pawl adapted to be operated by a space bar, and a tabulating member.

9. A carriage return control arrangement comprising, in combination, carriage drive means; a coupling having a disengaged position and a coupling position for connecting said carriage drive means with a carriage for moving the same in a return direction; shiftable lever means operatively connected with said coupling for moving the same between said positions; spring means urging said coupling with said lever means into said disengaged position; operator influenced means operatively connected with said lever means for shifting the same to effect movement of said coupling to said coupling position to cause a carriage return movement; spring-loaded locking means for locking said lever means in a shifted position in which said coupling means is in said coupling position; and a plurality of carriage control means respectively including engaging means for engaging the carriage, and a control bar for shiftable movement to and from an actuated position for moving the respective engaging means to a position engaging the carriage; and linkage means operatively connected with said locking means and including a turnable linkage member having a rod extending transversely to said bars so as to be engaged and displaced by each of said bars during movement to said actuated position so as to effect shifting of said turnable linkage member, said linkage, and said locking means and thereby shifting of said lever means to effect movement of said coupling to said disengaged position whereby said carriage drive means are separated from the carriage when one of said engaging means engages the carriage and impedes a return movement of the same.

10. An arrangement as set forth in claim 9 wherein said operator influenced means include an actuator bar shiftable between an inoperative position and an operative position, and lost-motion means connecting said actuator bar with said lever means so that said actuator bar can return to said inoperative position upon release by the operator while said lever means is locked by said locking means to maintain said coupling in said coupling position.

11. An arrangement as set forth in claim 10, wherein said lost-motion means include a turnable lever connected to said actuator bar and having a pin, and a slide member engaging said lever means and having a slot slidably receiving said pin.

12. An arrangement as set forth in claim 9, wherein said locking means includes a turnable locking member having an arm formed with a shoulder engaging said lever means in one turned position of said locking member and releasing the same in another turned position of said locking member, and being biased to assume said one turned position, said lever means blocking said locking member in said other position when said coupling is in said coupling position; and a link connecting said turnable locking member with said turnable linkage member.

13. An arrangement as set forth in claim 9 and including a margin stop adapted to be mounted on the carriage, a shiftable margin member shifted by said margin stop in a carriage end position, and a linkage connecting said shiftable margin member with said locking means so that the same releases said lever means in the carriage end position whereby said coupling is disengaged.

14. An arrangement as set forth in claim 9 and including a linkage connected to said lever means and operated by the same, said last mentioned linkage being adapted to be connected with an escapement device so that the same is rendered inoperative when said lever means places said coupling in said coupling position.

15. An arrangement as set forth in claim 9 wherein said turnable linkage member is U-shaped and has two legs connected by said rod, each of said control bars having a cam projection slidably engaging said rod for turning said linkage member.

16. An arrangement as set forth in claim 9 wherein said control bars are respectively adapted to be operated by a back-spacing device, a space bar, and a tabulator device.

17. An arrangement as set forth in claim 9 and including a support having a notch; and wherein said lever means include an angular lever cooperation with said locking means, and a spring-loaded lever having an edge mounted in said notch for turning movement and connecting said angular lever with said coupling.

References Cited by the Examiner
UNITED STATES PATENTS

| 1,567,590 | 12/1925 | Hart | 197—65 |
| 1,609,943 | 12/1926 | Hart | 197—65 |
| 1,824,099 | 9/1931 | Pitman | 197—176 |

ROBERT E. PULFREY, *Primary Examiner.*

EDGAR S. BURR, *Assistant Examiner.*